United States Patent

Hussain et al.

[11] Patent Number: 6,158,290
[45] Date of Patent: Dec. 12, 2000

[54] MASS FLOW METER

[75] Inventors: Yousif A. Hussain, Surrey; Chris N. Rolph, Redhill, both of United Kingdom

[73] Assignee: Krohne A.G., Basel, Switzerland

[21] Appl. No.: 09/519,786

[22] Filed: Mar. 7, 2000

Related U.S. Application Data

[63] Continuation of application No. 09/152,711, Sep. 14, 1998, abandoned, which is a continuation of application No. 08/827,750, Apr. 11, 1997, abandoned.

[51] Int. Cl.⁷ ................................................. G01F 1/84
[52] U.S. Cl. ............................................. 73/861.357
[58] Field of Search .................. 73/861.356, 861.357, 73/118.2, 11.04, 11.08

[56] References Cited

U.S. PATENT DOCUMENTS

| | | | |
|---|---|---|---|
| 3,218,851 | 11/1965 | Sipin | 73/861.357 |
| 4,793,191 | 12/1988 | Flecken et al. | 73/861.357 |
| 5,323,658 | 6/1994 | Yao et al. | 73/861.357 |
| 5,398,554 | 3/1995 | Ogawa et al. | 73/861.357 |
| 5,563,350 | 10/1996 | Kashimura et al. | 73/861.22 |

FOREIGN PATENT DOCUMENTS

| | | |
|---|---|---|
| 0272758 | 6/1988 | European Pat. Off. . |
| 0317340 | 5/1989 | European Pat. Off. . |
| 4408168C2 | 5/1995 | Germany . |
| 07174601 | 7/1995 | Japan . |

Primary Examiner—Hashad Patel
Attorney, Agent, or Firm—Cesari and McKenna, LLP

[57] ABSTRACT

A mass flow meter for flowing media that works on the Coriolis Principle includes at least one oscillating Coriolis line carrying the flowing medium and at least one housing holding the Coriolis line, and attachments to the housing. The mass flow meter is characterized by the fact that at least some of the attachments are connected to the housing via means of oscillation decoupling.

4 Claims, 2 Drawing Sheets

MASS FLOW METER

RELATED APPLICATIONS

This application is a continuation of Ser. No. 09/152,711, filed Sep. 14, 1998, now abandoned, which is a continuation of Ser. No. 08//827,750, filed Apr. 11, 1997, now abandoned.

The invention concerns a mass flow meter for flowing media that works on the Coriolis Principle, with at least one oscillating Coriolis line carrying the flowing medium and at least one housing holding the Coriolis line and attachments to the housing.

BACKGROUND OF THE INVENTION

A large number of designs are known for mass flow meters for flowing media that work on the Coriolis Principle. The number of proposals for making the Coriolis line run optimally is almost impossible to review. For the flowing medium to bring about the desired Coriolis effect in the Coriolis line, the Coriolis line must be in oscillation. An oscillator, or frequently several oscillators, is generally used for this purpose. In conventional flow meters, the mass flow of the flowing medium through the Coriolis line is determined by quantitative analysis of the Coriolis force acting on the oscillating Coriolis line. Since the Coriolis forces that occur are generally very small, conventional flow meters are particularly sensitive to the output and input of mechanical energy between the mass flow meter and its environment. In the past, the mechanical coupling between the flow meter and the pipelines connected to the flow meter received a lot of attention, and a great many suggestions have been made for solutions that attempt to reduce this mechanical coupling.

The coupling between the Coriolis line and the housing holding generally the Coriolis line, the oscillator or oscillators and the transducer or transducers that senses the motion of the Coriolis line has already been the subject of improvements as well. The common approach to this is to guarantee very strong decoupling between the Coriolis line and the housing by making the inherent frequency of the housing as different as possible from the oscillation frequency of the Coriolis line. To do so, the housing is generally designed to be very rigid to oscillation.

In the past, no attention was paid to the problem of the mechanical coupling between the Coriolis line and the housing, on one hand, and the flow meter's various attachments to the housing, on the other.

Frequently, a basic device, i.e., a unit consisting of the Coriolis line, an oscillator, a transducer and a housing, is used as the basis for a large number of mass flow meters for different purposes. Depending on the purpose for which the flow meter is used, various attachments are connected to the flow meter, respectively to its housing. Because these attachments are connected to the housing in a way that is generally undefined, mechanical couplings are created in systems capable of oscillation that can have a major influence on the measurement precision of the flow meter. These unwanted influences frequently cannot be prevented by the corresponding layout of the attachments, since the mechanical coupling is frequently also influenced by the specific on-site installation situation, whose design understandably cannot be considered. As a result, on the known flow meters, the influences determining the oscillation properties of the device cannot be determined in advance by a corresponding design, so that the measurement precision of the mass flow meter is already affected by inadequate definition of the whole mass flow meter as a system capable of oscillation.

The object of the invention is thus based on improving the known mass flow meters for flowing media that work on the Coriolis Principle in such a way that the technical oscillation properties of the whole device remain basically constant regardless of the different attachments, so that high measurement precision is guaranteed.

SUMMARY OF THE INVENTION

The object already presented and described is solved according to the invention by having at least a part of the attachments connected to the housing via means of oscillation decoupling. The measure in the invention guarantees a defined oscillation behavior of the mass flow meter, since the undefined influences of the attachments have very little or no effect on the oscillation behavior as a whole. According to known physical laws, the means of oscillation decoupling are designed so that, if possible, there is no, or only slight, oscillation coupling between the attachments and the housing.

Springs are especially good as means of oscillation decoupling for economic reasons. They are simple to make and synchronize and are available in a large number of forms of embodiment, adapted to the respective purpose for which they are used.

Oscillation decoupling between the attachments and the housing is advantageous, particularly for large-sized attachments, like for example electronic evaluation units, attachments with an outer abutment, like for example cables or pipe-type cables, and attachments with particularly defined oscillation properties, like for example means for heating the mass flow meter.

Now there are many different ways of designing and developing the mass flow meter according to the invention for flowing media that works on the Coriolis Principle. In this connection, please refer to the patent claims.

BRIEF DESCRIPTION OF THE DRAWINGS

For a fuller understanding of the nature and objects of the invention, reference should be had to the following detailed description taken in connection with the accompanying drawings, in which.

DETAILED DESCRIPTION OF THE PREFERRED EMBODIMENT

Figure 1:
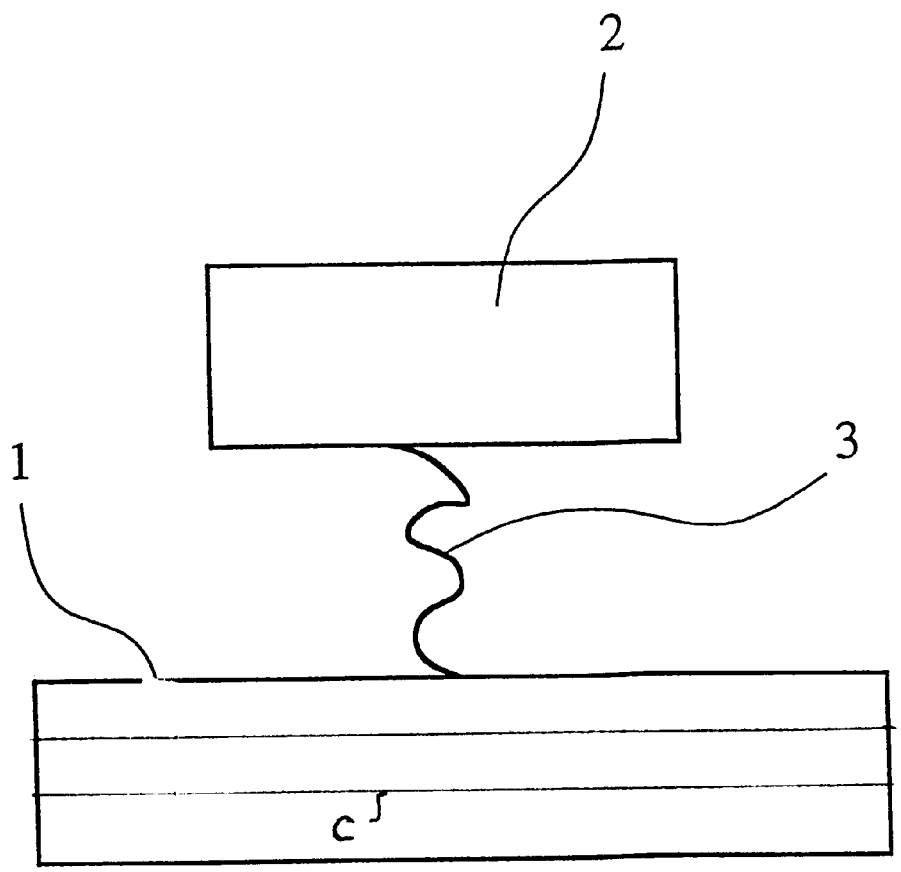
FIG. 1 is a schematic diagram to explain the principle of the invention.

FIG. 1 shows a mass flow meter for flowing media that works on the Coriolis Principle. The schematic drawing shows only the housing 1 holding a Coriolis line C, an attachment 2, not further specified, and a means 3 of oscillation decoupling according to the invention which connects the housing 1 to the attachment 2. By choosing spring and damping properties of the means 3 of oscillation decoupling that are tailored to the housing 1 and the attachment 2, the oscillation decoupling according to the invention between the housing 1 and the attachment 2 is guaranteed.

Figure 2:
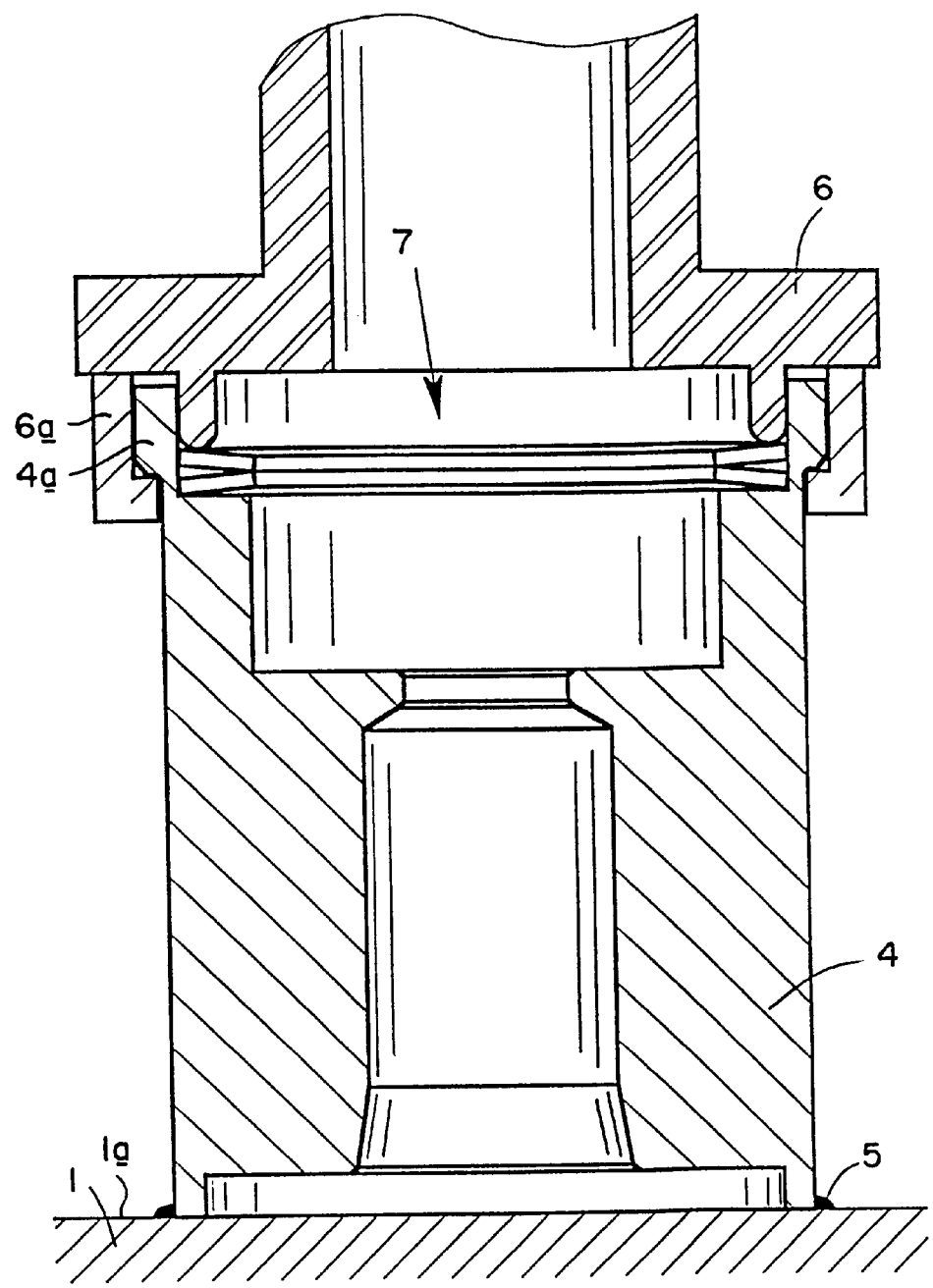
FIG. 2 is a sectional view of one embodiment of a connection according to the invention between a housing and an electronic evaluation unit.

FIG. 2 shows a special example of an embodiment of a mass flow meter for flowing media according to the invention that works on the Coriolis Principle. FIG. 2 shows only a cutout of this example of embodiment in cross section. A base 4 having a flange 4a is attached to the wall 1a of housing 1 via a solder connection 5. An attachment in the form of an electronic evaluation unit 6, shown only in section has a flange 6a that interfits with flange 4a forming a connection that allows relative movement of base 4 and electronic evaluation unit 6 only in the axial direction. A spring unit, shown generally at 7, forms a central element of this connection. Depending on the requirement, this spring unit 7 can be composed of one or more spring washers, one or more coil springs or one or more leaf springs. The spring unit 7 is thus designed to guarantee maximum oscillation decoupling of housing 1 and evaluation unit 6.

The measure according to the invention justifies the expense connected with it only in a case where the attachment in question has a substantial influence on the measurement precision of the mass flow meter. It is, therefore, not always necessary to connect all attachments to the housing via means of oscillation decoupling.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

What is claimed is:

1. The mass flow meter for flowing media that works on the Coriolis Principle, said flow meter comprising a Coriolis line having a first axis; a housing holding the Coriolis line, said housing having an exterior wall and a natural frequency of vibration; an attachment disposed adjacent to said exterior wall; cooperating connection means on said attachment and said exterior wall for connecting the attachment to the exterior wall while allowing relative motion thereof along a second axis perpendicular to said first axis, and biasing means disposed between the attachment and said exterior wall for biasing the attachment in one direction along said second axis, whereby when the mass flow meter is in operation, the natural frequency of the housing is substantially the same as if the attachment were not connected to the housing.

2. The mass flow meter defined in claim 1, wherein the biasing means comprises a spring.

3. The mass flow meter defined in claim 1, wherein the attachment is an evaluation unit.

4. The mass flow meter defined in claim 3, wherein the cooperating connection means comprise a first flange extending from the attachment, and a base has one end anchored to said exterior wall and has a second end defining a second flange, said first and second flanges interfitting so as to permit relative movement of said attachment and said base only along said second axis.

* * * * *